United States Patent
Liu et al.

(10) Patent No.: US 12,185,247 B2
(45) Date of Patent: Dec. 31, 2024

(54) TERMINAL WAKING METHOD, DEVICE AND STORAGE MEDIUM

(71) Applicant: ZTE Corporation, Guangdong (CN)

(72) Inventors: Xu Liu, Shenzhen (CN); Bo Dai, Shenzhen (CN); Xiubin Sha, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 415 days.

(21) Appl. No.: 17/487,766

(22) Filed: Sep. 28, 2021

(65) Prior Publication Data

US 2022/0078712 A1    Mar. 10, 2022

Related U.S. Application Data

(63) Continuation of application No. PCT/CN2020/077002, filed on Feb. 27, 2020.

(30) Foreign Application Priority Data

Mar. 29, 2019 (CN) .......................... 201910256225.6

(51) Int. Cl.
*H04W 52/02* (2009.01)
*H04W 68/00* (2009.01)

(52) U.S. Cl.
CPC ... *H04W 52/0232* (2013.01); *H04W 52/0219* (2013.01); *H04W 68/005* (2013.01)

(58) Field of Classification Search
CPC ......... H04W 52/0232; H04W 52/0219; H04W 68/005; H04W 68/02; H04W 52/0235; H04W 52/0229; Y02D 30/70

See application file for complete search history.

(56) References Cited

U.S. PATENT DOCUMENTS

| | | | |
|---|---|---|---|
| 11,382,039 B2 | 7/2022 | Jiang et al. | |
| 11,553,432 B2 * | 1/2023 | Hwang | H04W 52/0235 |
| 2014/0192720 A1 | 7/2014 | Lee et al. | |
| 2019/0069240 A1 | 2/2019 | Jiang | |
| 2019/0349856 A1 * | 11/2019 | Liu | H04W 52/0216 |
| 2020/0029302 A1 * | 1/2020 | Cox | H04W 56/0015 |
| 2020/0092808 A1 * | 3/2020 | Beale | H04W 28/04 |

(Continued)

FOREIGN PATENT DOCUMENTS

| | | |
|---|---|---|
| CN | 101841911 A | 9/2010 |
| CN | 104581894 A | 4/2015 |

(Continued)

OTHER PUBLICATIONS

Notice of Reexamination for corresponding Chinese Application No. 202210846806.7 dated Jun. 26, 2024, 13 pages.

(Continued)

*Primary Examiner* — Ayaz R Sheikh
*Assistant Examiner* — Tarell A Hampton
(74) *Attorney, Agent, or Firm* — Crowell & Moring LLP

(57) ABSTRACT

Provided are a terminal waking method and device, and a storage medium. The method includes: determining a traffic group where target terminals are located according to a traffic type of the target terminals; determining a sequence index corresponding to the target terminals at least according to the traffic group; and sending a wake up signal (WUS) corresponding to the sequence index to the target terminals.

12 Claims, 4 Drawing Sheets

Determine a traffic group where target terminals are located according to a traffic type of the target terminals — S110

Determine a sequence index corresponding to the target terminals at least according to the traffic group — S120

Send a wake up signal (WUS) corresponding to the sequence index to the target terminals — S130

(56) References Cited

U.S. PATENT DOCUMENTS

| | | | | |
|---|---|---|---|---|
| 2020/0145921 | A1* | 5/2020 | Zhang | H04W 52/0235 |
| 2020/0221416 | A1* | 7/2020 | Wong | H04W 68/005 |
| 2020/0229095 | A1* | 7/2020 | Shrestha | H04W 4/70 |
| 2021/0007053 | A1 | 1/2021 | Jiang et al. | |
| 2021/0037470 | A1* | 2/2021 | Åström | H04W 52/0229 |
| 2021/0314869 | A1* | 10/2021 | Ye | H04J 13/00 |
| 2021/0329550 | A1* | 10/2021 | Åström | H04W 68/02 |
| 2021/0345245 | A1* | 11/2021 | Li | H04W 52/0229 |
| 2022/0182815 | A1* | 6/2022 | Takeda | H04W 52/0219 |

FOREIGN PATENT DOCUMENTS

| | | |
|---|---|---|
| CN | 108738110 A | 11/2018 |
| CN | 109327888 A | 2/2019 |
| CN | 109429315 A | 3/2019 |
| CN | 110536384 A | 12/2019 |
| WO | WO 2011/144019 A1 | 11/2011 |
| WO | WO 2014/176979 A1 | 11/2014 |
| WO | WO 2018/175760 A1 | 9/2018 |
| WO | WO 2018/216871 A1 | 11/2018 |
| WO | WO 2020/199806 A1 | 10/2020 |

OTHER PUBLICATIONS

Huawei et al., "UE-Group based Wake-up signal," 3GPP TSG-RAN WG2 Meeting #103bis R2-1813915, dated Oct. 12, 2018, 3p, China.

Ericcson, "Wake-up signal UE grouping," 3GPP TSG-RAN WG2 Meeting #103bis R2-1815148, dated Oct. 12, 2018, 4p, China.

ZTE Corporation, "Consideration of UE group wake-up signal for NB-IoT and eMTC," 3GPP TSG-RAN WG2 Meeting ∩103bis R2-1814382, dated Oct. 12, 2018, 5p, China.

Extended European Search Report for corresponding application No. EP 20785368.0 dated Nov. 23, 2022, 11p.

LG Electronics, "Discussion on wake up signal function in NB-IoT", 3GPP YDH TSN WG1 Meeting #91, R1-1719877, Dec. 1, 2017, 4p, FR.

MediaTek Inc., "Wake Up Signal Design for NB-IoT", 3GPP TSG RAN WG1 Meeting #92bis, R1-1804140, Apr. 20, 2018, 6p, CN.

First Office Action for Chinese application No. 202210846806.7 dated Feb. 18, 2023, 7p, in Chinese language.

English translation of First Office Action for Chinese application No. 202210846806.7 dated Feb. 18, 2023, 4p.

Nokia et al., "Analysis of Group WUS Options", 3GPP TSG-RAN WG2 Meeting ∩104, Nov. 16, 2018, R2-1817048, 5p, US.

International Search Repor for priority application No. PCT/CN2020/077002 dated May 20, 2020, 3p, in Chinese language.

Written Opinion of the International Searching Authority for priority application No. PCT/CN2020/077002 dated May 20, 2020, 5p, in Chinese language.

English language translation of the International Search Report for priority application No. PCT/CN2020/077002 dated May 20, 2020, 2p.

Nokia et al. "Analysis of Group WUS Options," 3GPP TSG-RAN WG2 Meeting ∩104 R2-1817048, Nov. 1, 2018, 5p.

Concise Explanantion of Relevance for Written Opinion of the International Searching Authority for priority application No. PCT/CN2020/077002, 1p.

Examination Report for corresponding Canadian application No. 3,131,866 dated Nov. 16, 2023, 4p.

Rejection Decision for corresponding Chinese application No. 202210846806.7 dated May 5, 2023, 4p, in Chinese language.

English language translation of Rejection Decision for corresponding Chinese application No. 202210846806.7, dated May 5, 2023, 4p.

European Communication pursuant to Article 94(3) EPC, Oct. 21, 2024, pp. 1-11, issued in European Application Number 20 785 368.0, European Patent Office, Rijskijk, Netherlands.

* cited by examiner

TERMINAL WAKING METHOD, DEVICE AND STORAGE MEDIUM

This application is a continuation of International Application No. PCT/CN2020/077002, filed Feb. 27, 2020, which claims priority to Chinese Patent Application No. 201910256225.6, filed Mar. 29, 2019, the entireties of both of which are hereby incorporated by reference.

TECHNICAL FIELD

The present application relates to the field of wireless communication networks, for example, a terminal waking method and device, and a storage medium.

BACKGROUND

For a group of terminals with the same paging occasion, whether the terminal needs to listen to a paging message may be determined by detecting a wake up signal (WUS). For terminals with the same paging occasion, as long as one of the terminals is paged, a WUS is sent. In this way, some terminals that are not paged are also woken up and need to listen to the paging message to determine whether these terminals are paged, which results in certain power consumption. How to reduce the false wake-up rate is the key to solve the problem of unnecessary power consumption.

SUMMARY

Embodiments of the present application provide a terminal waking method and device, and a storage medium so as to reduce the probability of false wake-up of the target terminals.

An embodiment of the present application provides a terminal waking method. The method includes the steps described below.

A traffic group where target terminals are located is determined according to a traffic type of the target terminals.

A sequence index corresponding to the target terminals is determined at least according to the traffic group.

A WUS corresponding to the sequence index is sent to the target terminals.

An embodiment of the present application provides a terminal waking method. The method includes the steps described below.

A WUS sent by a base station is received.

A corresponding WUS sequence set is determined according to a preset traffic group; where the corresponding WUS sequence set includes one or more WUS group sequences, a subcommon group sequence, and a common group sequence.

A WUS detection is performed based on the WUS sequence set.

An embodiment of the present application provides a terminal waking device. The device includes a first determination module, a second determination module, and a first sending module.

The first determination module is configured to determine a traffic group where target terminals are located according to a traffic type of the target terminals.

The second determination module is configured to determine a sequence index corresponding to the target terminals at least according to the traffic group.

The first sending module is configured to send a WUS corresponding to the sequence index to the target terminals.

An embodiment of the present application provides a terminal waking device. The device includes a reception module, at least one processor, and a detection module.

The reception module is configured to receive a WUS sent by a base station.

The at least one processor is configured to determine a corresponding WUS sequence set according to a preset traffic group; where the corresponding WUS sequence set includes one or more WUS group sequences, a subcommon group sequence, and a common group sequence.

The detection module is configured to perform a WUS detection based on the WUS sequence set.

An embodiment of the present application provides a storage medium. The storage medium is configured to store a computer program, when the computer program is executed by a processor, the method in any of the embodiments described above is implemented.

DETAILED DESCRIPTION

Embodiments of the present application are described below in conjunction with the drawings. If not in collision, the embodiments described herein and the features thereof can be combined with one another.

In the process of Release 15, the wake up signal (WUS) is introduced. For terminals with the same paging occasion, if one of the terminals is paged, a base station will send a WUS before the paging occasion, and all terminals may detect the WUS. After the terminals detect the WUS, the terminals may further listen to a paging message.

The type of the gap of the WUS configured for a terminal may be divided into a discontinuous reception (DRX) gap, denoted as DRX_GAP, and an extended discontinuous reception (eDRX) gap, denoted as eDRX_GAP. The eDRX_GAP may be divided into a short extended discontinuous reception gap (short_eDRX_GAP) and a long extended discontinuous reception gap (long_eDRX_GAP) according to the length of time. The gap is the time-domain gap between sending a paging message and sending wake up information by the base station. When the base station receives a paging message sent by a core network, if a terminal supports the WUS, the terminal may be grouped according to all types of the gap before the paging occasion. If terminals with the same type of the gap are not paged, the base station does not send a WUS at the WUS position corresponding to this type of the gap. Otherwise, the base station sends a WUS at the WUS position corresponding to this type of the gap.

According to the relevant configuration parameters about the WUS in a received system information block (SIB) message, such as the value of a gap (time offset) between the WUS and the current paging occasion and the duration of the WUS, the terminal may determine the starting position of the WUS detection by reading the relevant configuration parameters about the WUS in the SIB message.

However, there are still a large number of terminals with the same type of the gap, and it is possible that only a small number of terminals are paged. Since the base station sends the WUS, for other terminals with the same gap type, the other terminals will be subjected to false wake-up, resulting in additional power consumption.

In order to reduce the probability that the terminals are subjected to the false wake-up, the embodiments of the present application provide a terminal waking method, which overcomes the problem that the terminals with the same paging occasion are subjected to the false wake-up and reduces the probability that the terminals are subjected to the false wake-up.

Figure 1:
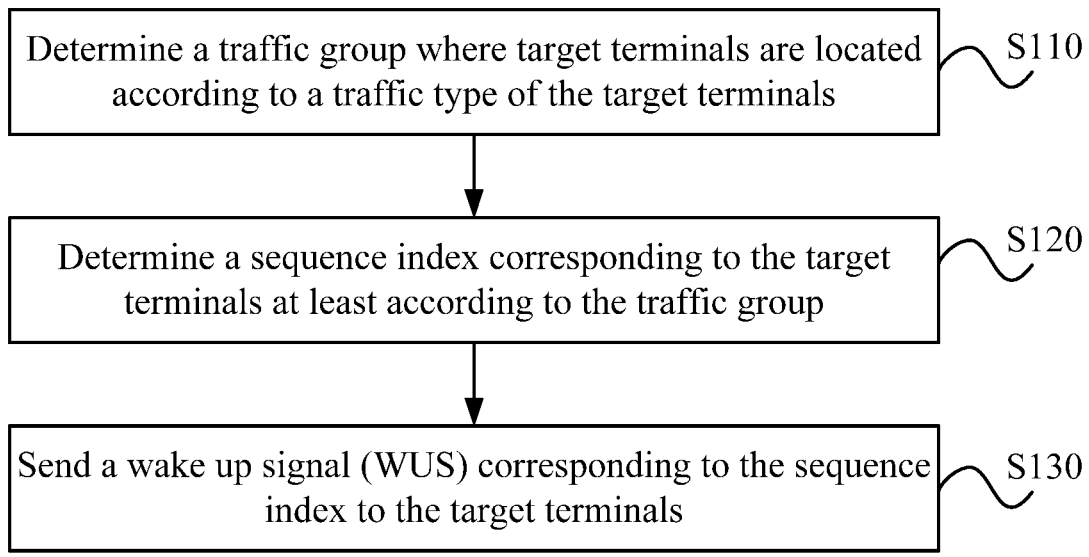
FIG. 1 is a flowchart of a terminal waking method according to an embodiment of the present application.

FIG. 1 is a flowchart of a terminal waking method according to an embodiment of the present application. As shown in FIG. 1, the method provided by this embodiment includes the steps S110 to S130.

In S110, a traffic group where target terminals are located is determined according to a traffic type of the target terminals.

In an embodiment, since the paging occasions of terminals with the same traffic type are basically the same and the terminals are grouped according to the traffic type, the terminals with the same traffic type usually listen to the paging message when they need to listen to the paging message, so as to achieve the purpose of reducing the false wake-up.

The traffic type of the target terminals includes at least one of: a traffic periodic time, a mobility state indication, a paging-rate, a paging-rate level or a preset uplink resource (PUR) attribute. It is to be understood that each target terminal may be grouped according to one traffic type, and terminals may also be grouped according to multiple traffic types, so as to obtain the traffic group where each target terminal is located. It is also to be understood that each traffic group includes one or more traffic types, and each target terminal corresponds to one traffic group.

In S120, a sequence index corresponding to the target terminals is determined at least according to the traffic group.

In the actual operation process, since each traffic group may correspond to multiple WUS groups, after the traffic group where each target terminal is located is obtained, the number of WUS groups corresponding to each traffic group is determined. If the number of WUS groups corresponding to the traffic group where target terminals are located is one, the sequence index corresponding to the target terminals is directly determined according to the traffic group. If the number of WUS groups corresponding to the traffic group where target terminals are located is two or more, the sequence index corresponding to the target terminals is determined according to the traffic group and target terminal identifications (IDs). In an embodiment, target terminals in each traffic group are classified again according to the IDs of the target terminals, and the sequence index corresponding to the target terminals is determined, where the sequence index is a WUS group sequence.

In S130, a WUS corresponding to the sequence index is sent to the target terminals.

After the WUS group sequence corresponding to each target terminal is determined, the base station sends the WUS of the WUS group sequence to the target terminals. Although other terminals with the same gap type may also detect the WUS, since the other terminals do not belong to the WUS group sequence, the other terminals cannot be woken up according to the WUS. It is to be understood that only target terminals belonging to the WUS group sequence may be woken up according to the WUS and then may listen to the paging message sent by the base station.

In the terminal waking method provided by this embodiment, the traffic group where the target terminals are located is determined according to the traffic type of the target terminals, the sequence index corresponding to the target terminals is determined at least according to the traffic group, and the WUS corresponding to the sequence index is sent to the target terminals. Since the terminals with the same traffic type usually have the paging message, after the target terminals are grouped according to the traffic type, the probability of the false wake-up of the target terminals is reduced.

In an example embodiment, the step in which the traffic group where target terminals are located is determined according to the traffic type of the target terminals includes the step that the target terminals are grouped according to a traffic periodic time of the target terminals.

The traffic periodic time may be an uplink traffic periodic time or a downlink traffic periodic time. In an embodiment, when the target terminals periodically report uplink traffics, the downlink needs to perform response feedback to the traffics. It is to be understood that when the traffic periodic time is the uplink traffic periodic time, the corresponding uplink traffic periodic time may be determined according to the reporting time of uplink traffics of the target terminals. When the traffic periodic time is the downlink traffic periodic time, the corresponding downlink traffic periodic time may be determined according to the feedback time of downlink traffics of the target terminals. For example, the traffic periodic time may be divided into three types, that is, a traffic periodic time of minute level, a traffic periodic time of hour level, and a traffic periodic time of day level. It is to be understood that according to the three types of the traffic periodic time, that is, minute level, hour level, and day level, the traffic group where the target terminals are located may include a traffic group of less than 1 minute, a traffic group of more than 1 minute and less than 1 hour, a traffic group of more than 1 hour and less than 1 day, and a traffic group of more than 1 day.

In an example embodiment, the step in which the traffic group where target terminals are located is determined according to the traffic type of the target terminals includes steps that a mobility state indication corresponding to the target terminals is determined according to attribute information of the target terminals, where the mobility state indication includes a stationary state and a moving state; and the target terminals are grouped according to the mobility state indication.

The attribute information of the target terminals refers to data information used for representing the characteristics of the target terminal. Of course, the attribute information corresponding to different target terminals is also different. For example, if the target terminal is a user equipment (UE), since the UE is mobile, the mobility state indication of the UE may be determined to be the moving state. In another example, if the target terminal is a desktop computer, since the desktop computer is fixed, the mobility state indication of the desktop computer may be determined to be the stationary state. It is to be understood that when the target terminals are grouped according to the mobility state indication of the target terminals, the target terminals may be divided into target terminals in the stationary state and target terminals in the moving state. Accordingly, the traffic group where the target terminals are located may be divided into the stationary state and the moving state according to the mobility state indication of the target terminals.

In an example embodiment, the step in which the traffic group where target terminals are located is determined according to the traffic type of the target terminals includes the step that the target terminals are grouped according to the paging-rate or the paging-rate level. The paging-rate level is determined according to the paging-rate of the target terminals and a preset paging-rate threshold, or the paging-rate level is directly determined through negotiation between the target terminals and a network side.

In an embodiment, in the actual operation process of determining the paging-rate level and the paging-rate of the target terminals, the target terminals and the network side may perform negotiation communication to directly determine the paging-rate and the paging-rate level of the target terminals. Of course, a threshold may be preset for the paging-rate and is denoted as a preset paging-rate threshold, and the paging-rate level may be determined according to the paging-rate of the target terminals and the preset paging-rate threshold. When the target terminals are grouped according to the paging-rate or the paging-rate level, the target terminals may be grouped according to one of the following situations: one paging-rate corresponds to one traffic group, multiple paging-rates correspond to one traffic group, one paging-rate level corresponds to one traffic group or multiple paging-rate levels correspond to one traffic group, so as to obtain multiple traffic groups.

In an embodiment, the paging-rate is also the paging periodic time and is used for indicating the probability that a target terminal is paged on each paging occasion. One paging-rate may correspond to one traffic group. For example, a paging-rate of 1% corresponds to traffic group 1, and a paging-rate of 2% corresponds to traffic group 2. Multiple paging-rates may also correspond to one traffic group. For example, paging-rates less than 10% correspond to traffic group 3.

The paging-rate level may be determined according to the paging-rate of the target terminals and the preset paging-rate threshold. For example, target terminals whose paging-rates are less than 10% belong to paging-rate level 1; target terminals whose paging-rates are greater than 10% and less than 40% belong to paging-rate level 2; target terminals whose paging-rates are greater than 40% and less than 70% belong to paging-rate level 3; and target terminals whose paging-rates are greater than 70% and less than 100% belong to paging-rate level 4. In an embodiment, one paging-rate level may correspond to one traffic group, or multiple paging-rate levels may correspond to one traffic group. For example, paging-rate level 1, paging-rate level 2, paging-rate level 3, and paging-rate level 4 correspond to traffic group 1, traffic group 2, traffic group 3, and traffic group 4 respectively. In another example, paging-rate level 1 and paging-rate level 2 correspond to traffic group 1. In another example, paging-rate level 3 and paging-rate level 4 correspond to traffic group 2.

In an example embodiment, the step in which the traffic group where target terminals are located is determined according to the traffic type of the target terminals includes the step that the target terminals are divided into a PUR UE and a non-PUR UE according to whether an idle terminal has a PUR attribute.

In an embodiment, the target terminals are grouped according to the PUR attribute and may be divided into two traffic groups, PUR UE traffic group and non-PUR UE traffic group. In an embodiment, for the base station side, when the base station does not receive an invalid PUR resource indication fed back by a UE and the PUR resource time does not exceed a reserved resource time, the base station considers this target terminal to be the PUR UE. If the base station receives the invalid PUR resource indication fed back by the UE or the PUR resource time exceeds the reserved resource time, the base station considers this target terminal to be the non-PUR UE. For the UE side, if a PUR resource is valid and the PUR resource time does not exceed the reserved resource time, or the UE has fed back the invalid PUR resource indication but receives an updated PUR resource issued by the base station, this target terminal is considered to be the PUR UE. If the PUR resource is invalid or the PUR resource time exceeds the reserved resource time or the UE feeds back the invalid PUR resource indication and receives an indication issued by the base station that no new PUR resource is available, the target terminal is considered to be the non-PUR UE.

In an embodiment, after the step in which the traffic group where target terminals are located is determined according to the traffic type of the target terminals, the traffic group also needs to be configured with signaling information. In an embodiment, the terminal waking method further includes the steps described below.

In S140, signaling information is configured for the traffic group.

The traffic group is determined according to at least one of the following traffic types: a traffic periodic time, a mobility state indication, a paging-rate, a paging-rate level or a PUR attribute. For the implementation of determining the traffic group according to the traffic type of the target terminals, reference is made to the description in the preceding embodiments.

When the base station sends the WUS corresponding to the sequence index to the target terminals, in order to enable the target terminals to accurately detect the corresponding WUS, the signaling information is configured for the traffic group corresponding to the target terminals. In an embodiment, the signaling information may be configured for the traffic group according to the traffic type of the target terminals. For the implementation, reference is made to the description in the following embodiments.

In an embodiment, the signaling information includes at least one of: the number of WUS groups, a starting sequence index of the WUS groups, a WUS group resource, whether a subcommon group sequence is enabled, a subcommon group sequence index, a common group sequence index or whether a common group sequence is enabled.

The number of WUS groups is the total number of WUS groups corresponding to the traffic group. The starting sequence index of the WUS groups is a starting sequence index of the WUS groups corresponding to the traffic group. The WUS group resource is a time-frequency resource where a WUS corresponding to the traffic group is located. Whether the subcommon group sequence is enabled indicates whether a traffic group sequence contains the subcommon group sequence. The subcommon group sequence index is a sequence corresponding to at least two WUS groups of the same traffic group. The common group sequence index is a sequence corresponding to all WUS groups corresponding to time-frequency resources corresponding to the traffic group. Whether the common group sequence is enabled indicates whether a traffic group sequence contains the common group sequence.

In S150, the signaling information is sent to the target terminals.

After the base station completes the configuration of the signaling information, the base station may directly send the signaling information to the target terminals so that the target terminals may obtain the WUS group sequence to which the target terminals themselves belong, a subcommon group sequence, and a common group sequence.

TABLE 1

Classification table of traffic groups corresponding to the traffic periodic time

| Traffic type index | Traffic group |
|---|---|
| Traffic_index0 | Periodic Time <= 1 min |
| Traffic_index1 | 1 min < Periodic Time < 1 hour |
| Traffic_index2 | 1 hour <= Periodic Time < 1 day |
| Traffic_index3 | Periodic Time >= 1 day |

After the correspondence between each traffic group and each traffic type index is determined, signaling information is configured for each traffic group. Table 2 is a configuration table of signaling information corresponding to the traffic periodic time according to an embodiment of the present application.

TABLE 2

Configuration table of signaling information corresponding to the traffic periodic time

| Traffic type index | Number of WUS groups in the traffic group | Starting sequence index of WUS groups | WUS group resource | Subcommon group sequence index | Common group sequence index |
|---|---|---|---|---|---|
| Traffic_index0 | 2 | sequence_0 | time-frequency resource_0 | sequence_4 | sequence_6 |
| Traffic_index1 | 2 | sequence_2 | time-frequency resource_0 | sequence_5 | sequence_6 |
| Traffic_index2 | 1 | sequence_0 | time-frequency resource_1 | NA | sequence_6 |
| Traffic_index3 | 3 | sequence_1 | time-frequency resource_1 | sequence_5 | sequence_6 |

In an embodiment, each traffic group contains one or more traffic types, and each traffic group corresponds to a set of signaling information. It is to be understood that one traffic group may correspond to one or more traffic types, but each traffic group corresponds to a set of signaling information.

In an embodiment, the signaling information may be configured for the traffic group according to the traffic type of the target terminals. In an embodiment, for at least one of the following traffic types: the traffic periodic time, the mobility state indication, the paging-rate, the paging-rate level or the PUR attribute, at least one of the following information may be configured: the number of WUS groups, the starting sequence index of the WUS groups, the WUS group resource, whether the subcommon group sequence is enabled, the subcommon group sequence index, the common group sequence index or whether the common group sequence is enabled.

In an embodiment, the configuration of the signaling information is illustrated by using an example that the traffic type is the traffic periodic time. Table 1 is a classification table of traffic groups corresponding to the traffic periodic time according to an embodiment of the present application. As can be seen from Table 1, there is a correspondence between traffic groups and traffic type indexes. For example, if the traffic periodic time is less than 1 minute (min), the traffic type index is denoted as Traffic_index0 if the traffic periodic time is greater than 1 minute and less than 1 hour, the traffic type index is denoted as Traffic_index1; if the traffic periodic time is greater than 1 hour and less than 1 day, the traffic type index is denoted as Traffic_index2; and so on.

The value range of the number of WUS groups of one or more traffic groups is {0, 1, . . . , maximum number}. The WUS group sequence index of each traffic group may be jointly determined by the starting sequence index of WUS groups and the number of WUS groups in the each traffic group. For example, Traffic_index0 corresponds to two WUS groups, which are WUS group 0 and WUS group 1 respectively, and since the starting sequence index of the WUS groups corresponding to Traffic_index0 is sequence_0, the WUS group sequence index corresponding to WUS group 1 is sequence_1. The WUS group resource may adopt time-frequency resource 0 or time-frequency resource 1.

In an embodiment, multiple WUS groups in the same traffic type adopt a code division multiplexing (CDM) mode; and multiple WUS groups of different traffic types adopt at least one of: a CDM mode, a time division multiplexing (TDM) mode or a frequency division multiplexing (FDM) mode. For example, if the CDM mode is adopted between the traffic type index Traffic_index0 and the traffic type index Traffic_index1 in Table 2, multiple WUS groups in the traffic groups all occupy the same time-frequency resource which is time-frequency resource 0. If the CDM mode is adopted between the traffic type index Traffic_index2 and the traffic type index Traffic_index3, multiple WUS groups in the traffic groups occupy the same time-frequency resource which is time-frequency resource 1. The TDM mode is used among the traffic type indexes Traffic_index0, Traffic_index1, Traffic_index2, and Traffic_index3, multiple WUS groups in the traffic group occupy different time-frequency resources which are time-frequency resource 0, time-frequency resource 0, time-frequency resource 1, and time-frequency resource 1, respectively.

In an embodiment, when the number of WUS groups of one traffic group is only one or zero, the subcommon group sequence is invalid. That is, when the number of WUS groups contained in one traffic group is greater than 1, the one traffic group corresponds to one subcommon group sequence. For example, if the one traffic group corresponding to the traffic group index Traffic_index2 in Table 2 contains one WUS group, there is no corresponding subcommon group sequence index.

In an embodiment, when multiple traffic groups are multiplexed on the same time-frequency resource, one traffic group corresponds to one subcommon group sequence, and the multiple traffic groups correspond to the same common group sequence. It is to be understood that when the number of corresponding traffic groups on one time-frequency resource is greater than 1, one traffic group corresponds to one subcommon group sequence, and multiple traffic groups correspond to the same common group sequence. For example, if the traffic groups corresponding to Traffic_index0 and Traffic_index1 in Table 2 are multiplexed on time-frequency resource 0, the traffic groups corresponding to Traffic_index0 and Traffic_index1 correspond to the subcommon group sequence sequence_4 and the subcommon group sequence sequence_5, respectively, and the traffic groups corresponding to Traffic_index0 and Traffic_index1 correspond to the common group sequence sequence_6.

In an embodiment, the base station may also implicitly configure the signaling information. Table 3 is an implicit configuration table of signaling information corresponding to the traffic periodic time according to an embodiment of the present application.

TABLE 3

Implicit configuration table of signaling information corresponding to the traffic periodic time

| Traffic type index | Number of WUS groups of traffic | WUS group resource | Whether the subcommon group sequence is enabled | Whether the common group sequence is enabled |
|---|---|---|---|---|
| Traffic_index0 | 2 | time-frequency resource_0 | Yes | Yes |
| Traffic_index1 | 2 | time-frequency resource_0 | Yes | Yes |
| Traffic_index2 | 1 | time-frequency resource_1 | No | Yes |
| Traffic_index3 | 3 | time-frequency resource 1 | Yes | Yes |

For the implicit configuration manner shown in Table 3, the target terminals derive all WUS group sequence indexes, the WUS group resource, the subcommon group sequence index, and the common group sequence index which are associated with the target terminals themselves. One or more WUS group sequence indexes in the traffic group index Traffic_index0 may be further determined through a grouping method. In an embodiment, when WUS groups of multiple traffic groups are multiplexed on the same time-frequency resource, a WUS sequence corresponding to the multiple traffic groups is determined according to a traffic type index and a WUS group index corresponding to the target terminals.

For example, the WUS group is randomly selected according to the target terminal ID, WUS group 0 corresponds to WUS group sequence index 0 (sequence_0), and WUS group 1 corresponds to WUS group sequence index 1 (sequence_1). Since Traffic_index1 occupies two WUS group sequences, the subcommon group sequence index corresponding to one or more WUS groups in Traffic_index0 is sequence_4, and the common group sequence index is sequence_6.

Table 4 is a configuration table of signaling information corresponding to the WUS group sequence index in the traffic periodic time according to an embodiment of the present application.

TABLE 4

Configuration table of signaling information corresponding to the WUS group sequence index in the traffic periodic time

| WUS group sequence index | WUS group resource | Subcommon group sequence index | Common group sequence index | Common group resource |
|---|---|---|---|---|
| gWUS_0 | time-frequency resource_0 | sequence_0 | sequence_1 | time-frequency resource_0 |
| gWUS_1 | time-frequency resource_0 | sequence_0 | sequence_1 | time-frequency resource_0 |
| gWUS_2 | time-frequency resource_1 | sequence_0 | sequence_1 | time-frequency resource_0 |
| gWUS_3 | time-frequency resource_1 | sequence_0 | sequence_1 | time-frequency resource_0 |

As shown in Table 4, WUS group sequence index gWUS_0 and WUS group sequence index gWUS_1 adopt the CDM mode; WUS group sequence index gWUS_2 and WUS group sequence index gWUS_3 adopt the CDM mode; the common group resource may use time-frequency domain resource 0, time-frequency domain resource 1, or a new resource time-frequency resource 2 may be added, and if the common group resource uses the new resource time-frequency resource 2, the WUS group sequence is sequence_0.

In an embodiment, the configuration of the signaling information is illustrated by using an example that the traffic type is the paging-rate and the paging-rate level. Table 5 is a classification table of traffic groups corresponding to the paging-rate and the paging-rate level according to an embodiment of the present application. As can be seen from Table 5, there is a correspondence between traffic groups and traffic type indexes. For example, if the paging-rate is less than or equal to 1% or the paging-rate level is 0, the traffic type index is denoted as Traffic_index0 if the paging-rate is greater than 1% and less than 10% or the paging-rate level is 1, the traffic type index is denoted as Traffic_index0 and so on.

TABLE 5

Classification table of traffic groups corresponding to the paging-rate and the paging-rate level

| Traffic type index | Traffic group |
|---|---|
| Traffic_index0 | paging-rate <= 1% or paging-rate level 0 |
| Traffic_index1 | 1% < paging-rate < 10% or paging-rate level 1 |
| Traffic index2 | 10% <= paging-rate < 50% or paging-rate level 2 |
| Traffic_index3 | paging-rate >= 50% or paging-rate level 3 |

After the correspondence between each traffic group and each traffic type index is determined, signaling information is configured for each traffic group. Table 6 is a configuration table of signaling information corresponding to the paging-rate and the paging-rate level according to an embodiment of the present application.

TABLE 6

Configuration table of signaling information corresponding to the paging-rate and the paging-rate level

| Traffic group index | Number of WUS groups in the traffic group | Starting sequence index of WUS groups | WUS group resource | Subcommon group sequence index | Common group sequence index |
|---|---|---|---|---|---|
| Traffic_index0 | 2 | sequence_0 | time-frequency resource_0 | sequence_4 | sequence_6 |
| Traffic_index1 | 2 | sequence_2 | time-frequency resource_0 | sequence_5 | sequence_6 |
| Traffic_index2 | 1 | sequence_0 | time-frequency resource_1 | NA | sequence_6 |
| Traffic_index3 | 3 | sequence_1 | time-frequency resource_1 | sequence_5 | sequence_6 |

For the explanation of Table 6, reference is made to the explanation of Table 2 in the preceding embodiments. The details are not repeated here.

In an embodiment, the base station may also implicitly configure the signaling information. Table 7 is an implicit configuration table of signaling information corresponding to the paging-rate and the paging-rate level according to an embodiment of the present application.

TABLE 7

Implicit configuration table of signaling information corresponding to the paging-rate and the paging-rate level

| Traffic type index | Number of WUS groups in the traffic group | WUS group resource | Whether the subcommon group sequence is enabled | Whether the common group sequence is enabled |
|---|---|---|---|---|
| Traffic_index0 | 2 | time-frequency resource_0 | Yes | Yes |
| Traffic_index1 | 2 | time-frequency resource_0 | Yes | Yes |
| Traffic_index2 | 1 | time-frequency resource_1 | No | Yes |
| Traffic_index3 | 3 | time-frequency resource_1 | Yes | Yes |

For the explanation of Table 7, reference is made to the explanation of Table 3 in the preceding embodiments. The details are not repeated here.

Table 8 is a configuration table of signaling information corresponding to the WUS group sequence index in the paging-rate and the paging-rate level according to an embodiment of the present application.

TABLE 8

Configuration table of the configuration of signaling information corresponding to the WUS group sequence index in the paging-rate and the paging-rate level

| WUS group sequence index | WUS group resource | Subcommon group sequence index | Common group sequence index | Common group resource |
|---|---|---|---|---|
| gWUS_0 | time-frequency resource_0 | sequence_0 | sequence_1 | time-frequency resource_0 |
| gWUS_1 | time-frequency resource_0 | sequence_0 | sequence_1 | time-frequency resource_0 |
| gWUS_2 | time-frequency resource_1 | sequence_0 | sequence_1 | time-frequency resource_0 |
| gWUS_3 | time-frequency resource_1 | sequence_0 | sequence_1 | time-frequency resource_0 |

For the explanation of Table 8, reference is made to the explanation of Table 4 in the preceding embodiments. The details are not repeated here.

In an embodiment, the configuration of the signaling information is illustrated by using an example that the traffic type is the PUR attribute. Table 9 is a classification table of traffic groups corresponding to the PUR attribute according to an embodiment of the present application. As can be seen from Table 9, there is a correspondence between traffic groups and traffic type indexes. For example, a UE allocated with a PUR resource (PUR UE) corresponds to the traffic type index Traffic_index0, and a UE not allocated with a PUR resource (non-PUR UE) corresponds to the traffic type index Traffic_index1.

TABLE 9

Classification table of traffic groups corresponding to the PUR attribute

| Traffic type index | Traffic group |
|---|---|
| Traffic_index0 | UE allocated with a PUR resource |
| Traffic_index1 | UE not allocated with a PUR resource |

The starting sequence index of WUS groups, WUS group resource, subcommon group sequence index, common group sequence index corresponding to each traffic group are respectively configured in the manners of Table 2 to Table 3, and at least one of the WUS group resource, subcommon group sequence index, common group sequence index, or WUS group sequence index corresponding to each WUS group is configured in the manner of Table 4.

In an embodiment, the configuration of the signaling information is illustrated by using an example that the traffic type is the paging-rate, the paging-rate level, and the mobility state indication. Table 10 is a classification table of traffic groups corresponding to the paging-rate or the paging-rate level and the mobility state indication according to an embodiment of the present application. As can be seen from Table 10, there is a correspondence between traffic groups and traffic type indexes. For example, if the paging-rate is less than 1% or the paging-rate level is 0 and the mobility state indication is the moving state, the traffic type index is denoted as Traffic_index0.

TABLE 10

Classification table of traffic groups corresponding to the paging-rate or the paging-rate level and the mobility state indication

| Traffic type index | Traffic group |
| --- | --- |
| Traffic_index0 | paging-rate <= 1% or paging-rate level 0 and the moving state |
| Traffic_index1 | paging-rate <= 1% or paging-rate level 0 and the stationary state |

TABLE 10-continued

Classification table of traffic groups corresponding to the paging-rate or the paging-rate level and the mobility state indication

| Traffic type index | Traffic group |
| --- | --- |
| Traffic_index2 | 1% < paging-rate < 10% or paging-rate level 1 and the moving state |
| Traffic_index3 | 1% < paging-rate < 10% or paging-rate level 1 and the stationary state |
| Traffic_index4 | 10% <= paging-rate < 50% or paging-rate level 2 and the moving state |
| Traffic_index5 | 10% <= paging-rate < 50% or paging-rate level 2 and the stationary state |
| Traffic_index6 | paging-rate >= 50% or paging-rate level 3 and the moving state |
| Traffic_index7 | paging-rate >= 50% or paging-rate level 3 and the stationary state |

The starting sequence index of WUS groups, WUS group resource, subcommon group sequence index, common group sequence index corresponding to each traffic group are respectively configured in the manners of Table 2 to Table 3, and at least one of the WUS group resource, subcommon group sequence index, common group sequence index, and WUS group sequence index corresponding to each WUS group is configured in the manner of Table 4.

The preceding configuration information is broadcast to the target terminals through a broadcast message, and the base station indicates which grouping method is used to configure the corresponding signaling information. After the target terminals receive the configuration information of the related traffic grouping, the target terminals determine the group to which the WUS belongs to which the target terminals belong according to the relevant indication information and the configuration information. If the paging-rate attribute determined through the negotiation between the target terminals and the core network (network node) is the paging-rate, the base station includes corresponding threshold information of the paging-rate level in the configuration information and the corresponding threshold information of the paging-rate level is determined for the paging-rate, and then configures mapping information between the paging-rate level and the traffic group.

In an embodiment, the target terminals determine the WUS group index according to their own IDs and configure the signaling information of each WUS group index. Table 11 is a configuration table of signaling information corresponding to the WUS group index according to an embodiment of the present application.

TABLE 11

Configuration table of signaling information corresponding to the WUS group index

| WUS group index | WUS group resource | Subcommon group sequence index | Subcommon group resource | Common group sequence index | Common group resource |
| --- | --- | --- | --- | --- | --- |
| gWUS_0 | time-frequency resource_0 | subCommon WUS_0 | time-frequency resource_0 | Common WUS_0 | time-frequency resource_0 |
| gWUS_1 | time-frequency resource_1 | subCommon WUS_1 | time-frequency resource_1 | Common WUS_1 | time-frequency resource_1 |
| gWUS_2 | time-frequency resource_2 | subCommon WUS_2 | time-frequency resource_2 | Common WUS_2 | time-frequency resource_2 |
| gWUS_3 | time-frequency resource_3 | subCommon WUS_3 | time-frequency resource_3 | Common WUS_3 | time-frequency resource_3 |

In Table 11, there is a correspondence of each WUS group, WUS group resources, subcommon group sequence indexes (subcommon WUS), common group sequence indexes (Common WUS), subcommon group resources, and common group resources.

Figure 2:
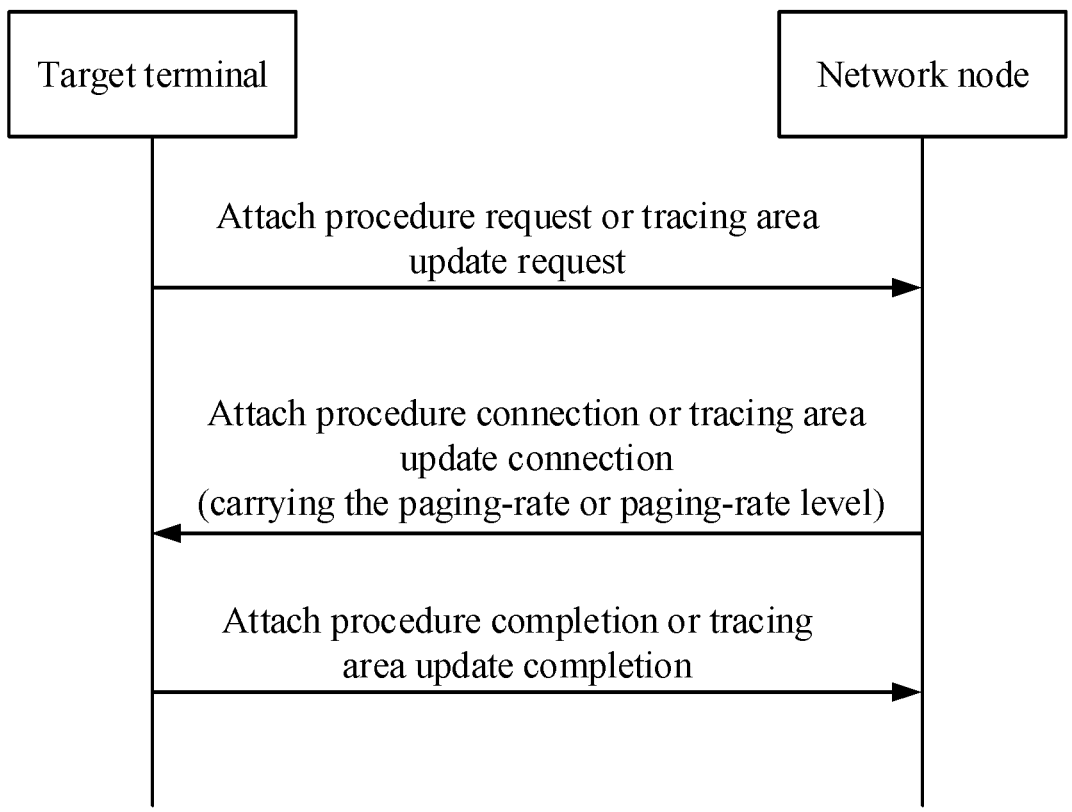
FIG. 2 is a schematic diagram of a communication interaction between target terminals and a network node according to an embodiment of the present application.

In an embodiment, to support the grouping of target terminals based on the traffic type of the paging-rate and the paging-rate level, there must be a definite consistent traffic type between the target terminals and the network side first. Therefore, the negotiation communication between the target terminal ands the network node (for example, a mobility management entity (MME)) is required to determine the paging-rate of the target terminals. FIG. 2 is a schematic diagram of a communication interaction between the target terminals and the network node according to an embodiment of the present application. As shown in FIG. 2, the target terminals perform negotiation through non-access stratum (NAS) signaling during the attach procedure or in the tracing area update (TAU) to determine the paging-rate or the paging-rate level.

Figure 3:
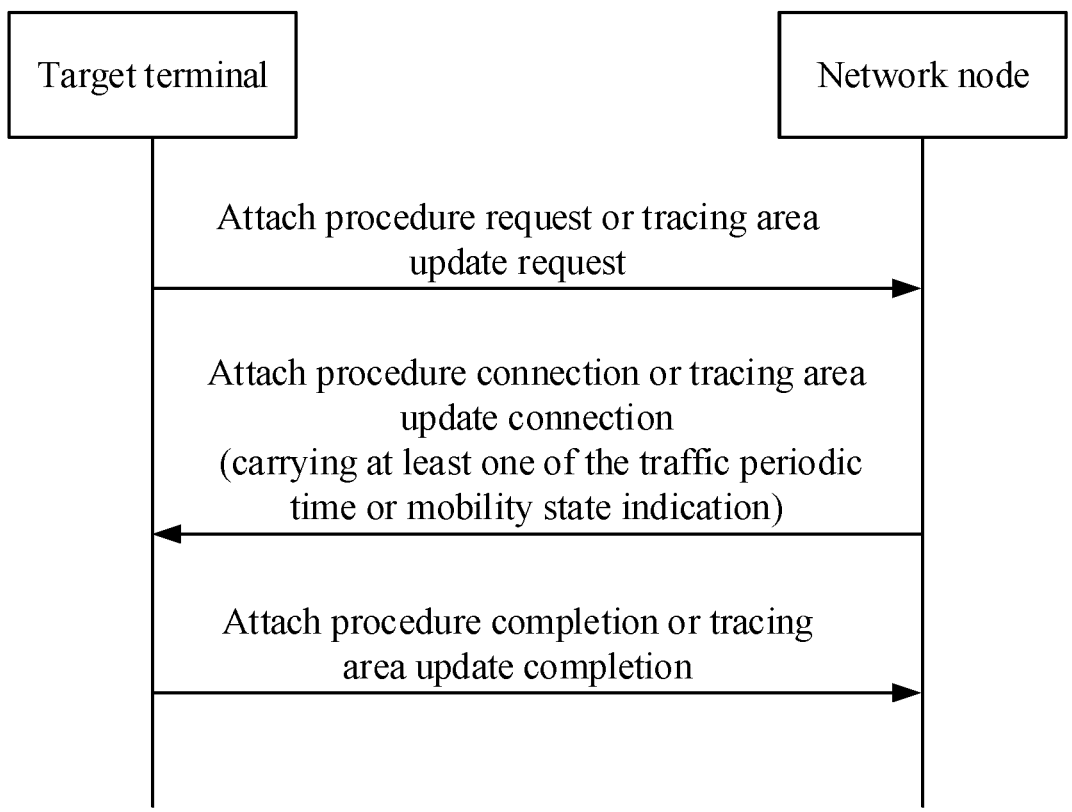
FIG. 3 is a schematic diagram of another communication interaction between target terminals and a network node according to an embodiment of the present application.

In an embodiment, to support the grouping of target terminals based on the traffic type of the paging-rate and the paging-rate level, there must be a definite consistent traffic type between the target terminals and the network side first. Therefore, the target terminals and the network node (for example, an MME) need to negotiate to determine the traffic periodic time and the mobility state indication. FIG. 3 is a schematic diagram of another communication interaction between target terminals and a network node according to an embodiment of the present application. As shown in FIG. 3, the target terminals perform negotiation with the network node through the NAS signaling during the attach procedure or in the TAU to determine the traffic periodic time and the mobility state indication.

Figure 4:
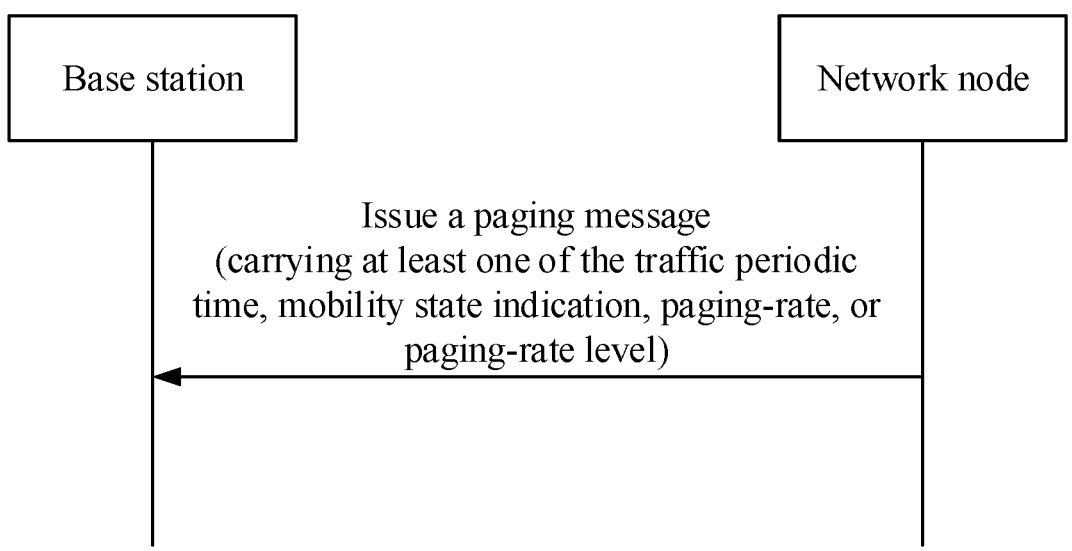
FIG. 4 is a schematic diagram of a communication interaction between a base station and a network node according to an embodiment of the present application.

In an embodiment, the core network carries at least one of the following traffic types: the traffic periodic time, mobility state indication, paging-rate, or paging-rate level in the process of issuing a paging message to the base station, and sends the traffic type of the target terminals to the base station. FIG. 4 is a schematic diagram of a communication interaction between a base station and a network node according to an embodiment of the present application. As shown in FIG. 4, the network node carries at least one of the following traffic types: the traffic periodic time, mobility state indication, paging-rate, or paging-rate level in the process of sending the paging message to the base station.

In an embodiment, for target terminals on the same paging occasion, the traffic group type to which the target terminals belong is determined according to a traffic grouping rule, and then the target terminals belonging to the same traffic group are randomly grouped according to the IDs.

The base station configures configuration information of the WUS duration and/or the WUS starting position information of each traffic type based on the traffic grouping, and then configures one or more pieces of configuration information of the WUS duration and WUS starting position information of one or more groups that are grouped based on the target terminal IDs in one or more traffic types.

The target terminals may obtain the starting position information of the first layer WUS according to their own traffic type, and then accurately obtain the position information of the second layer WUS and/or the configuration information of the WUS duration according to the grouping method based on the target terminal IDs.

In an embodiment, the target terminals on the same paging occasion are randomly grouped based on the target terminal IDs, and then target terminals of each group are divided into corresponding groups according to the traffic grouping method.

The base station configures the configuration information of the WUS duration and/or the WUS starting position information of each group grouped based on the target terminal IDs, and each traffic type corresponds to one or more pieces of configuration information of the WUS duration and/or WUS starting position information based on the traffic group.

The target terminals obtain the first layer group according to the grouping method based on the target terminal IDs, and then determine the WUS position information and/or the configuration information of the WUS duration related to the target terminals according to the traffic type and the corresponding configuration information.

In an embodiment, the type of the gap of the WUS includes a discontinuous reception gap (DRX_GAP) and an extended discontinuous reception gap (eDRX_GAP), the gap is a time-domain gap between sending a paging message and sending a wake up signal by a base station.

In the case where the eDRX_GAP and the DRX_GAP are the same, WUS groups are ordered sequentially according to an order of a WUS group of the DRX_GAP and a WUS group of the eDRX_GAP; or WUS groups are ordered sequentially according to an order of a WUS group of the eDRX_GAP and a WUS group of the DRX_GAP.

In an embodiment, each WUS sequence is sent before the paging occasion. The specific time-domain gap before the paging occasion is defined by the gap (DRX_GAP, short-eDRX_GAP, and long-eDRX_GAP), and the target terminals may know the starting position where the WUS detection starts through the gap value that the target terminals have. When traffic is classified according to the DRX and the eDRX, since the value ranges of the DRX_GAP, short-eDRX_GAP, and long-eDRX_GAP overlap, if the eDRX_GAP and the DRX_GAP are the same, the WUS group of the DRX is numbered, and then the WUS group of the eDRX is numbered; alternatively, the WUS group of the eDRX is numbered, and then the WUS group of the DRX is numbered.

Figure 5:
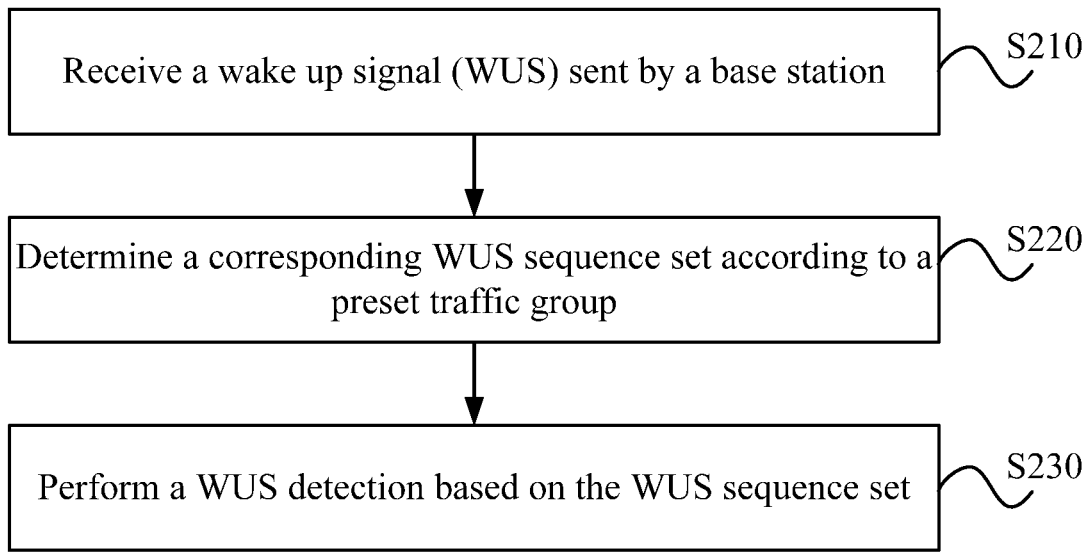
FIG. 5 is a flowchart of another terminal waking method according to an embodiment of the present application.

FIG. 5 is a flowchart of another terminal waking method according to an embodiment of the present application. As shown in FIG. 5, the method provided by this embodiment includes the steps described below.

In S210, a WUS sent by a base station is received.

When the base station sends a WUS of a sequence index, all target terminals may receive the WUS.

In S220, the corresponding WUS sequence set is determined according to a preset traffic group.

The corresponding WUS sequence set includes one or more WUS group sequences, a subcommon group sequence, and a common group sequence.

The target terminals determine at least one of the WUS group sequence, the subcommon group sequence or the common group sequence corresponding to the target terminals according to the signaling information configured by the base station. Each traffic group may correspond to one or more WUS group sequences, one subcommon group sequence, and one common group sequence.

In S230, a WUS detection is performed based on the WUS sequence set.

The target terminals determine the WUS to which the target terminals belong based on the WUS group sequence, the subcommon group sequence, and the common group sequence. If the sequence index of the WUS sent by the base station is consistent with the WUS group sequence, the subcommon group sequence, and the common group sequence to which the target terminals belong, the target terminals may be woken up according to the WUS.

In an embodiment, in order to enable the target terminals to detect the WUS corresponding to the sequence index sent by the base station, the signaling information needs to be configured for the traffic group where the target terminals are located. In an embodiment, S220 comprises the steps described below.

In S2201, signaling information is configured according to the preset traffic group.

The signaling information includes at least one of: the number of WUS groups, a starting sequence index of the WUS groups, a WUS group resource, whether a subcommon group sequence is enabled, a subcommon group sequence index, a common group sequence index or whether a common group sequence is enabled.

The number of WUS groups is the total number of WUS groups corresponding to the traffic group. The starting sequence index of the WUS groups is a starting sequence index of the WUS groups corresponding to the traffic group. The WUS group resource is a time-frequency resource where a WUS corresponding to the traffic group is located. Whether the subcommon group sequence is enabled indicates whether a traffic group sequence contains the subcommon group sequence. The subcommon group sequence index is a sequence corresponding to at least two WUS groups of the same traffic group. The common group sequence index is a sequence corresponding to all WUS groups corresponding to time-frequency resources corresponding to the traffic group. Whether the common group sequence is enabled indicates whether a traffic group sequence contains the common group sequence.

In S2202, the corresponding WUS sequence set is determined according to the signaling information.

The signaling information includes the starting sequence index of the WUS groups, the subcommon group sequence index, and the common group sequence index. It is to be understood that the target terminals may determine the corresponding WUS group sequence, subcommon group sequence, and common group sequence according to the starting sequence index of the WUS groups, the subcommon group sequence index, and the common group sequence index.

In an embodiment, when WUS groups of multiple traffic groups are multiplexed on the same time-frequency resource, a WUS sequence corresponding to the multiple traffic groups is determined according to a traffic type index and a WUS group index corresponding to the target terminals.

In an embodiment, the type of the gap of the WUS includes the DRX_GAP and the eDRX_GAP.

In the case where the eDRX_GAP and the DRX_GAP are the same, WUS groups are ordered sequentially according to an order of a WUS group of the DRX_GAP and a WUS group of the eDRX_GAP; or WUS groups are ordered sequentially according to an order of a WUS group of the eDRX_GAP and a WUS group of the DRX_GAP.

Figure 6:
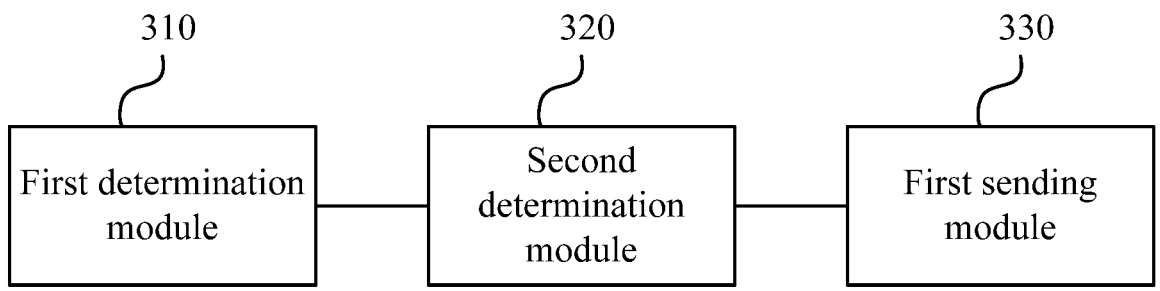
FIG. 6 is a structure diagram of a terminal waking device according to an embodiment of the present application.

FIG. 6 is a structure diagram of a terminal waking device according to an embodiment of the present application. As shown in FIG. 6, the terminal waking device provided by this embodiment includes a first determination module 310, a second determination module 320, and a first sending module 330.

The first determination module 310 is configured to determine a traffic group where target terminals are located according to a traffic type of the target terminals. The second determination module 320 is configured to determine a sequence index corresponding to the target terminals at least according to the traffic group. The first sending module 330 is configured to send a WUS corresponding to the sequence index to the target terminals.

The terminal waking device provided by this embodiment is configured to implement the terminal waking method in the embodiment shown in FIG. 1. The implementation principle and technical effect are similar to those of the terminal waking method, and thus the details are not repeated here.

In an embodiment, the first determination module is configured to group the target terminals according to a traffic periodic time of the target terminals.

In an embodiment, the first determination module includes a determination unit and a grouping unit.

The determination unit is configured to determine a mobility state indication corresponding to the target terminals according to attribute information of the target terminals; and the mobility state indication includes a stationary state and a moving state.

The grouping unit is configured to group the target terminals according to the mobility state indication.

In an embodiment, the first determination module is configured to group the target terminal according to a paging-rate or a paging-rate level, and the paging-rate level is determined according to the paging-rate of the target terminals and a preset paging-rate threshold, or the paging-rate level is directly determined through negotiation between the target terminals and a network side.

In an embodiment, the first determination module is configured to divide the target terminals into a PUR UE and a non-PUR UE according to whether an idle terminal has a PUR attribute.

In an embodiment, the terminal waking device further includes a configuration module and a second sending module.

The configuration module is configured to configure signaling information for the traffic group, and the traffic group is determined according to at least one of the following traffic types: a traffic periodic time, a mobility state indication, a paging-rate, a paging-rate level or a PUR attribute.

The second sending module is configured to send the signaling information to the target terminals.

In an embodiment, the configuration module is configured to configure each traffic group to contain one or more traffic types, and configure each traffic group to correspond to a set of signaling information.

In an embodiment, the signaling information includes at least one of: the number of WUS groups, a starting sequence index of the WUS groups, a WUS group resource, whether a subcommon group sequence is enabled, a subcommon group sequence index, a common group sequence index or whether a common group sequence is enabled.

The number of WUS groups is the total number of WUS groups corresponding to the traffic group. The starting sequence index of the WUS groups is a starting sequence index of the WUS groups corresponding to the traffic group. The WUS group resource is a time-frequency resource where a WUS corresponding to the traffic group is located. Whether the subcommon group sequence is enabled indicates whether a traffic group sequence contains the subcommon group sequence. The subcommon group sequence index is a sequence corresponding to at least two WUS groups of the same traffic group. The common group sequence index is a sequence corresponding to all WUS groups corresponding to time-frequency resources corresponding to the traffic group. Whether the common group sequence is enabled indicates whether a traffic group sequence contains the common group sequence.

In an embodiment, in the case where WUS groups of multiple traffic groups are multiplexed on the same time-frequency resource, a WUS sequence corresponding to the multiple traffic groups is determined according to a traffic type index and a WUS group index corresponding to the target terminals.

In an embodiment, in the case that multiple traffic groups are multiplexed on the same time-frequency resource, one traffic group corresponds to one subcommon group sequence, and the multiple traffic groups correspond to the same common group sequence.

In an embodiment, the type of the gap of the WUS includes a DRX_GAP and an eDRX_GAP, where the gap is a time-domain gap between sending a paging message and sending a wake up signal by a base station. In a case where the eDRX_GAP and the DRX_GAP are the same, WUS groups are ordered sequentially according to an order of a WUS group of the DRX_GAP and a WUS group of the eDRX_GAP; or WUS groups are ordered sequentially according to an order of a WUS group of the eDRX_GAP and a WUS group of the DRX_GAP.

In an embodiment, multiple WUS groups in the same traffic type adopt a CDM mode; and multiple WUS groups of different traffic types adopt at least one of: a CDM mode, a TDM mode or an FDM mode.

Figure 7:
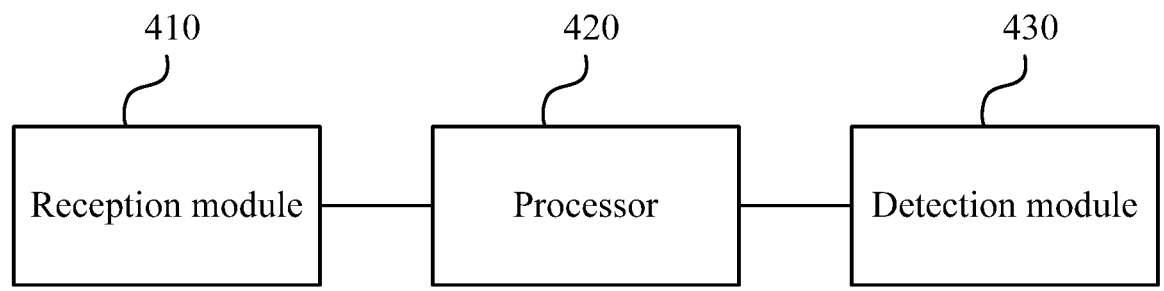
FIG. 7 is a structure diagram of another terminal waking device according to an embodiment of the present application.

FIG. 7 is a structure diagram of another terminal waking device according to an embodiment of the present application. As shown in FIG. 7, the terminal waking device provided by this embodiment includes a reception module 410, at least one processor 420, and a detection module 430.

The reception module 410 is configured to receive a WUS sent by a base station.

The at least one processor 420 is configured to determine a corresponding WUS sequence set according to a preset traffic group; and the corresponding WUS sequence set includes one or more WUS group sequences, a subcommon group sequence, and a common group sequence.

The detection module 430 is configured to perform a WUS detection based on the WUS sequence set.

The terminal waking device provided by this embodiment is configured to implement the terminal waking method in the embodiment shown in FIG. 5. The implementation principle and technical effect are similar to those of the terminal waking method, and thus the details are not repeated here.

In an embodiment, the at least one processor is configured to configure signaling information according to the preset traffic group; and determine the corresponding WUS sequence set according to the signaling information.

In an embodiment, the signaling information includes at least one of: the number of WUS groups, a starting sequence index of the WUS groups, a WUS group resource, whether a subcommon group sequence is enabled, a subcommon group sequence index, a common group sequence index or whether a common group sequence is enabled.

The number of WUS groups is the total number of WUS groups corresponding to the traffic group. The starting sequence index of the WUS groups is a starting sequence index of the WUS groups corresponding to the traffic group. The WUS group resource is a time-frequency resource where a WUS corresponding to the traffic group is located. Whether the subcommon group sequence is enabled indicates whether a traffic group sequence contains the subcommon group sequence. The subcommon group sequence index is a sequence corresponding to at least two WUS groups of the same traffic group. The common group sequence index is a sequence corresponding to all WUS groups corresponding to time-frequency resources corresponding to the traffic group. Whether the common group sequence is enabled indicates whether a traffic group sequence contains the common group sequence.

In an embodiment, in the case where WUS groups of multiple traffic groups are multiplexed on the same time-frequency resource, a WUS sequence corresponding to the multiple traffic groups is determined according to a traffic type index and a WUS group index corresponding to the target terminals.

In an embodiment, the type of the gap of the WUS includes the DRX_GAP and the eDRX_GAP.

In the case where the eDRX_GAP and the DRX_GAP are the same, WUS groups are ordered sequentially according to an order of a WUS group of the DRX_GAP and a WUS group of the eDRX_GAP; or WUS groups are ordered sequentially according to an order of a WUS group of the eDRX_GAP and a WUS group of the DRX_GAP.

Figure 8:
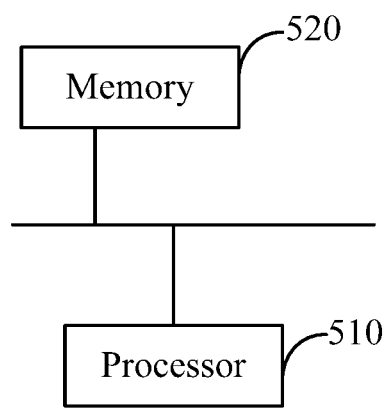
FIG. 8 is a structural diagram of a device according to an embodiment of the present application.

FIG. 8 is a structural diagram of a device according to an embodiment of the present application. As shown in FIG. 8, the device provided in the present application includes a processor 510 and a memory 520. The number of processors 510 in the device may be one or more, and FIG. 8 is illustrated by using an example in which there is one processor 510. The number of memories 520 in the device may be one or more, and FIG. 8 is illustrated by using an example in which there is one memory 520. The processor 510 and the memory 520 of the device may be connected by a bus or in other manners, and FIG. 8 is illustrated by using an example of the connection by the bus. In an embodiment, the device is a base station.

The memory 520, as a computer-readable storage medium, may be configured to store software programs and computer-executable programs and modules such as program instructions/modules corresponding to the equipment in any embodiment of the present application (such as the first determination module, the second determination module, and the first sending module in the terminal waking device). The memory 520 may include a program storage region and a data storage region, where the program storage region may store an operating system and an application program required by at least one function while the data storage region may store data created depending on the use of a device. In addition, the memory 520 may include a high-speed random access memory, and may also include a non-volatile memory such as at least one disk memory, flash memory or other non-volatile solid-state memories. In some examples, the memory 520 may further include memories located remotely relative to the processor 510, and these remote memories may be connected to the equipment via a network. The examples of the preceding network include, but are not limited to, the Internet, an intranet, a local area network, a mobile communication network, and a combination thereof.

The device provided above may be configured to execute the terminal waking method applied to the base station provided in any of the embodiments described above, and the device has the corresponding functions and beneficial effects.

When the device is a target terminal, the program stored in the memory 520 may be a program instruction/module that corresponds to the terminal waking method applied to the target terminals provided in the embodiments of the present application. The processor 510 executes the software programs, instructions, and modules stored in the memory 520 so as to perform one or more function applications and data processing, that is, to implement the terminal waking method applied to the target terminal described in the preceding method embodiments. It is to be understood that when the device is a target terminal, the device may execute the terminal waking method provided in any of the embodiments of the present application, and has corresponding functions and effects.

An embodiment of the present application further provides a storage medium including computer-executable instructions. The computer-executable instructions are used for executing a terminal waking method when executed by a computer processor. The method is applied to a base station side and includes the following steps: a traffic group where target terminals are located is determined according to a traffic type of the target terminals; a sequence index corresponding to the target terminals is determined at least according to the traffic group; and a WUS corresponding to the sequence index is sent to the target terminals.

An embodiment of the present application further provides a storage medium including computer-executable instructions. The computer-executable instructions are used for executing a terminal waking method when executed by a computer processor. The method is applied to a target terminal side and includes the following steps: a WUS sent by a base station is received; the corresponding WUS sequence set is determined according to a preset traffic group, where the corresponding WUS sequence set includes one or more WUS group sequences, a subcommon group sequence, and a common group sequence; and a WUS detection is performed based on the WUS sequence set.

It is to be understood by those skilled in the art that the term user equipment encompasses any suitable type of wireless user equipment, such as mobile phones, portable data processing devices, portable web browsers, or vehicle-mounted mobile stations.

In general, multiple embodiments of the present application may be implemented in hardware, a dedicated circuit, software, logic, or any combination thereof. For example, some aspects may be implemented in hardware while other aspects may be implemented in firmware or software that may be executed by a controller, a microprocessor, or other computing apparatuses, although the present application is not limited thereto.

Embodiments of the present application may be implemented by a data processor of a mobile apparatus executing computer program instructions. The implementation, for example, may be in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow in drawings of the present application may represent program steps, or may represent interconnected logic circuits, modules, and functions, or may represent a combination of program steps, logic circuits, modules, and functions. The computer program may be stored in a memory. The memory may be of any type suitable for a local technical environment and may be implemented using any suitable data storage technology, such as, but not limited to, a read-only memory (ROM), a random-access memory (RAM) and an optical memory device and system (digital video disc (DVD) or compact disc (CD)). The computer-readable storage medium may include a non-transitory storage medium. The data processor may be of any type suitable to the local technical environment, such as but not limited to, a general purpose computer, a special purpose computer, a microprocessor, a digital signal processing (DSP), an application specific integrated circuit (ASIC), a field-programmable gate array (FGPA), and a processor based on a multi-core processor architecture.

What is claimed is:

1. A terminal waking up method, comprising:
configuring, by a base station, a set of signaling information for a traffic group where a target terminal is located, wherein the traffic group corresponds to one or more paging rates of the target terminal;
sending, by the base station, the set of signaling information to the target terminal, wherein the set of signaling information indicates whether a common group sequence is enabled for the traffic group, whether the common group sequence is enabled indicating whether a traffic group sequence contains a common group sequence;
configuring, by the base station, a sequence index of a wake up signal (WUS) group for the target terminal according to the traffic group; and
sending, by the base station, a WUS corresponding to the sequence index of the WUS group to the target terminal.

2. The method of claim 1, wherein the set of signaling information comprises a number of WUS groups, the number of WUS groups being a total number of WUS groups corresponding to the traffic group.

3. A terminal waking up method, comprising:
receiving, by a target terminal from a base station, a set of signaling information for a traffic group where the target terminal is located, wherein the traffic group corresponds to one or more paging rates of the target terminal, wherein the set of signaling information indicates whether a common group sequence is enabled for the traffic group, whether the common group sequence is enabled indicating whether-a traffic group sequence contains a common group sequence;
receiving, by the target terminal from the base station, a wake up signal (WUS) corresponding to a sequence index of a WUS group for the target terminal according to the traffic group; and
performing, by the target terminal, a WUS detection based on the sequence index of the WUS group.

4. The method of claim 3, wherein the set of signaling information comprises a number of WUS groups, the number of WUS groups being a total number of WUS groups corresponding to the traffic group.

5. The method of claim 3, wherein the set of signaling information comprises a WUS group resource, the WUS group resource being a time-frequency resource where a WUS corresponding to the traffic group is located.

6. The method of claim 1, wherein the set of signaling information comprises a WUS group resource, the WUS group resource being a time-frequency resource where a WUS corresponding to the traffic group is located.

7. A wireless communication device, comprising:
one or more memories, storing one or more programs; and
one or more processors, in communication with the one or more memories and configured to execute the one or more programs to perform steps comprising:
configuring, by a base station, a set of signaling information for a traffic group where a target terminal is located, wherein the traffic group corresponds to one or more paging rates of the target terminal;
sending, by the base station, the set of signaling information to the target terminal, wherein the set of signaling information indicates whether a common group sequence is enabled for the traffic group, whether the common group sequence is enabled indicating whether a traffic group sequence contains a common group sequence;
configuring, by the base station, a sequence index of a wake up signal (WUS) group for the target terminal according to the traffic group; and
sending, by the base station, a WUS corresponding to the sequence index of the WUS group to the target terminal.

8. The wireless communication device of claim 7, wherein the set of signaling information comprises a number of WUS groups, the number of WUS groups being a total number of WUS groups corresponding to the traffic group.

9. The wireless communication device of claim 7, wherein the set of signaling information comprises a WUS group resource, the WUS group resource being a time-frequency resource where a WUS corresponding to the traffic group is located.

10. A wireless communication device, comprising:
one or more memories, storing one or more programs;
one or more processors, in communication with the one or more memories and configured to execute the one or more programs to perform steps comprising:
receiving, by a target terminal from a base station, a set of signaling information for a traffic group where the target terminal is located, wherein the traffic group corresponds to one or more paging rates of the target terminal and the set of signaling information indicates whether common group sequence is enabled for the traffic group, whether the common group sequence is enabled indicating whether a traffic group sequence contains a common group sequence;

receiving, by the target terminal from the base station, a wake up signal (WUS) corresponding to a sequence index of a WUS group for the target terminal according to the traffic group; and performing, by the target terminal, a WUS detection based on the sequence index of the WUS group.

11. The wireless communication device of claim 10, wherein the set of signaling information comprises a number of WUS groups, the number of WUS groups being a total number of WUS groups corresponding to the traffic group.

12. The wireless communication device of claim 10, wherein the set of signaling information comprises a WUS group resource, the WUS group resource be a time-frequency resource where a WUS corresponding to the traffic group is located.

\* \* \* \* \*